United States Patent
Tachiwa et al.

(10) Patent No.: US 12,176,734 B2
(45) Date of Patent: Dec. 24, 2024

(54) POWER TRANSMISSION APPARATUS, POWER RECEPTION APPARATUS, COMMUNICATION METHODS THEREFOR, AND NON-TRANSITORY COMPUTER-READABLE STORAGE MEDIUM

(71) Applicant: CANON KABUSHIKI KAISHA, Tokyo (JP)

(72) Inventors: Wataru Tachiwa, Kanagawa (JP); Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/334,998

(22) Filed: Jun. 14, 2023

(65) Prior Publication Data

US 2023/0327500 A1 Oct. 12, 2023

Related U.S. Application Data

(63) Continuation of application No. PCT/JP2021/038879, filed on Oct. 21, 2021.

(30) Foreign Application Priority Data

Dec. 17, 2020 (JP) .................................. 2020-209553
Aug. 2, 2021 (JP) .................................. 2021-126879

(51) Int. Cl.
  *H02J 50/80* (2016.01)
  *H04B 5/79* (2024.01)
  (Continued)

(52) U.S. Cl.
  CPC ................ *H02J 50/80* (2016.02); *H04B 5/79* (2024.01); *H02J 50/10* (2016.02); *H02J 50/60* (2016.02)

(58) Field of Classification Search
  CPC . H02J 50/80; H02J 50/10; H02J 50/60; H04B 5/79
  (Continued)

(56) References Cited

U.S. PATENT DOCUMENTS

| 2015/0244425 A1* | 8/2015 | Nakase | H02J 7/00034 |
| | | | 307/104 |
| 2016/0087455 A1* | 3/2016 | Tanabe | H02J 50/12 |
| | | | 307/104 |

(Continued)

FOREIGN PATENT DOCUMENTS

| JP | 2012217224 A | 11/2012 |
| JP | 2015056959 A | 3/2015 |

(Continued)

*Primary Examiner* — Alfonso Perez Borroto
(74) *Attorney, Agent, or Firm* — Canon U.S.A., Inc. IP Division

(57) ABSTRACT

A power transmission apparatus comprises: transmission unit configured to perform wireless power transmission to a power reception apparatus; first communication unit configured to perform communication via a first communication method; and second communication unit configured to perform communication via a second communication method, wherein, in a case where the transmission unit stops wireless power transmission to the power reception apparatus in a state in which the second communication unit and the power reception apparatus are connected based on information transmitted and received between the first communication unit and the power reception apparatus, the second communication unit performs communication to connect the second communication unit and the power reception apparatus.

19 Claims, 10 Drawing Sheets

POWER RECEPTION APPARATUS — 101

POWER TRANSMISSION APPARATUS — 100

(51) Int. Cl.
*H02J 50/10* (2016.01)
*H02J 50/60* (2016.01)

(58) Field of Classification Search
USPC .......................................... 307/104
See application file for complete search history.

(56) References Cited

U.S. PATENT DOCUMENTS

| | | | |
|---|---|---|---|
| 2016/0181818 A1* | 6/2016 | Joye ................. | H02J 50/60 |
| | | | 307/104 |
| 2018/0205260 A1* | 7/2018 | Maniktala ............ | H01F 38/14 |
| 2019/0280534 A1 | 9/2019 | Park | |
| 2019/0312469 A1 | 10/2019 | Shichino | |
| 2019/0363758 A1 | 11/2019 | Shichino | |

FOREIGN PATENT DOCUMENTS

| | | | |
|---|---|---|---|
| JP | 2015180177 A | 10/2015 | |
| JP | 2018129942 A | 8/2018 | |
| JP | 2019187070 A | 10/2019 | |
| JP | 2020096491 A | 6/2020 | |
| JP | 2020182294 A | 11/2020 | |

* cited by examiner

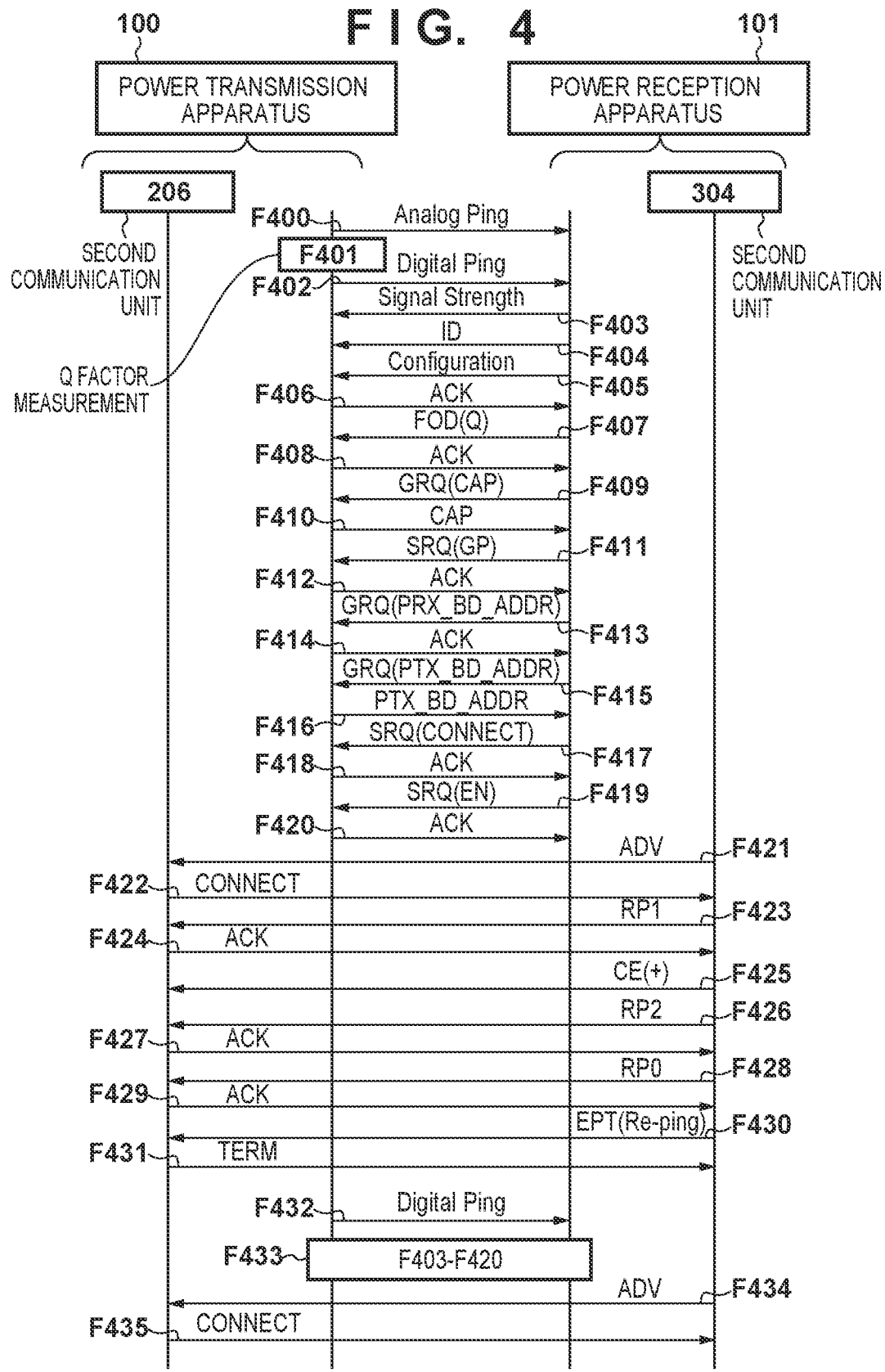

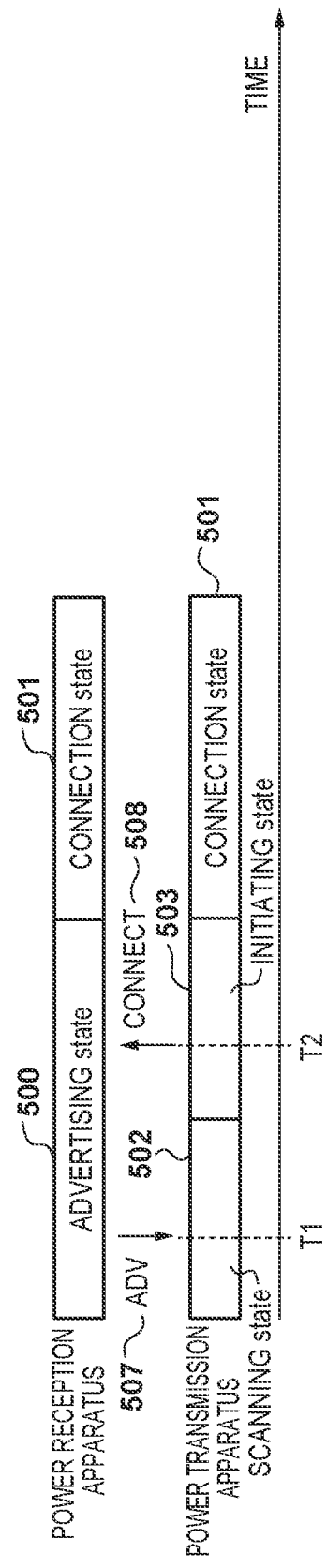

POWER TRANSMISSION APPARATUS, POWER RECEPTION APPARATUS, COMMUNICATION METHODS THEREFOR, AND NON-TRANSITORY COMPUTER-READABLE STORAGE MEDIUM

CROSS-REFERENCE TO RELATED APPLICATIONS

This application is a Continuation of International Patent Application No. PCT/JP 2021/038879 filed on Oct. 21, 2021, which claims the benefit of Japanese Patent Application No. 2020-209553 filed on Dec. 17, 2020 and Japanese Patent Application No. 2021-126879 filed on Aug. 2, 2021, all of which are hereby incorporated by reference herein in their entireties.

BACKGROUND

Field

The present disclosure relates to wireless power transmission technology.

Background Art

Recent years have seen a wide spread in the technical development of wireless power transmission systems. PTL1 discloses a power transmission apparatus and a power reception apparatus that comply with a standard (WPC standard) established by the Wireless Power Consortium (WPC), which is a consortium working toward the standardization of wireless power transmission standards. Furthermore, PTL2 discloses a technique in which, in a wireless power transmission system, control signals for power transmission/reception are transmitted and received using a frequency or coil/antenna different from the frequency or coil/antenna used for power transmission/reception. Note that communication performed using the frequency or coil/antenna used for power transmission/reception is called in-band communication, and communication performed using a frequency or coil/antenna different from the frequency or coil/antenna used for power transmission/reception is called out-band communication.

CITATION LIST

Patent Literature

PTL1: Japanese Patent Laid-Open No. 2015-56959
PTL2: Japanese Patent Laid-Open No. 2012-217224

According to the WPC standard, power transmission/reception and control communication therefor are performed via magnetic induction. Furthermore, a power transmission apparatus and a power reception apparatus complying with the WPC standard perform control communication using the same frequency as that used for power transmission/reception. In other words, the control communication is in-band communication. Generally, with in-band communication, the communication range in which communication can be performed without errors is smaller compared to that with out-band communication. Conventionally, no investigation has been carried out regarding appropriate control of communication between a power transmission apparatus and a power reception apparatus that can execute both in-band communication and out-band communication.

SUMMARY

The present disclosure has been made in view of the above-mentioned problem, and various embodiments seek to provide a technique for appropriately controlling communication between a power transmission apparatus and a power reception apparatus that can execute both in-band communication and out-band communication.

In various embodiments, a power transmission apparatus according to the present disclosure has the following configuration. That is, there is provided a power transmission apparatus comprising: transmission unit configured to perform wireless power transmission to a power reception apparatus; first communication unit configured to perform communication via a first communication method; and second communication unit configured to perform communication via a second communication method, wherein, in a case where the transmission unit stops wireless power transmission to the power reception apparatus in a state in which the second communication unit and the power reception apparatus are connected based on information transmitted and received between the first communication unit and the power reception apparatus, the second communication unit performs communication to connect the second communication unit and the power reception apparatus.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 4 is a sequence diagram of the power transmission apparatus and the power reception apparatus.

FIG. 5A is a diagram for describing operation timings of the power transmission apparatus and the power reception apparatus.

DESCRIPTION OF THE EMBODIMENTS

Figure 1:
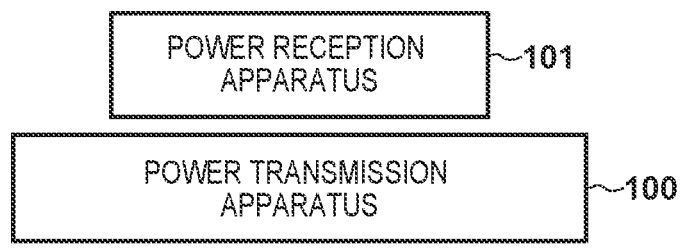
FIG. 1 illustrates an example configuration of a wireless power transmission system.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

Embodiment 1

[System Configuration]

FIG. 1 illustrates an example configuration of a wireless power transmission system according to the present embodiment. The present wireless power transmission system is configured to include a power transmission apparatus 100 and a power reception apparatus 101. Furthermore, the power transmission apparatus 100 and the power reception apparatus 101 each have the function of communicating via Bluetooth (registered trademark) Low Energy (BLE). In the following, a BLE communication unit (unit constituted by a communication circuit or the like) may be referred to as "BLE".

In the present embodiment, the power transmission apparatus 100 functions as a BLE central, and the power reception apparatus 101 functions as a BLE peripheral. "Central" indicates a BLE control station, and "peripheral" indicates a BLE terminal station. A BLE central performs communication with a BLE peripheral, and does not perform communication with other centrals. Furthermore, a BLE peripheral performs communication with a BLE central, but does not perform communication with other peripherals. That is, in BLE, centrals do not perform communication with one another, and peripherals do not perform communication with one another. Furthermore, a central can be in connection state (BLE CONNECT state) with a plurality of peripherals, and can transmit and receive data to and from a plurality of peripherals.

The power transmission apparatus 100 and the power reception apparatus 101 may be configured so to be built into other devices (cameras, smartphones, tablet PCs, laptops, automobiles, robots, medical devices, printers) and to supply power to such devices.

[Configuration of Power Transmission Apparatus]

Figure 2:
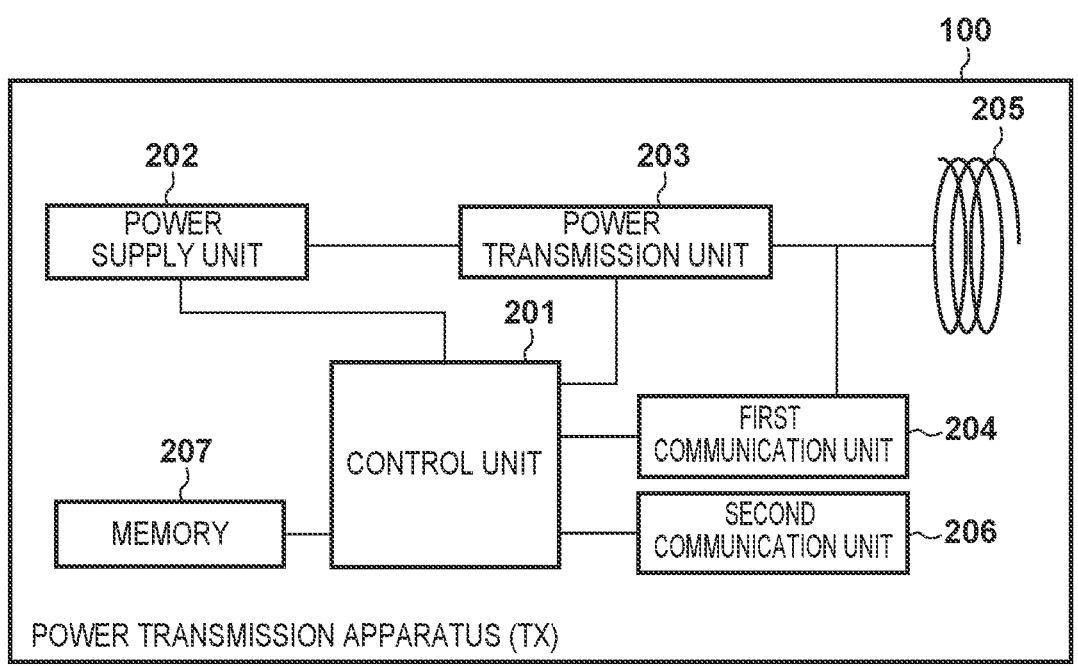
FIG. 2 is a block diagram illustrating an example configuration of a power transmission apparatus.

FIG. 2 is a block diagram illustrating an example configuration of the power transmission apparatus 100. For example, the power transmission apparatus 100 includes a control unit 201, a power supply unit 202, a power transmission unit 203, a first communication unit 204, a power transmission coil 205, a second communication unit 206, and a memory 207.

The control unit 201 controls the entire power transmission apparatus. As one example, the control unit 201 may be configured to include one or more processors such as a central processing unit (CPU) and/or a micro processing unit (MPU). Note that the control unit 201 may include an application-specific integrated circuit (ASIC), a field-programmable gate array (FPGA), or the like that is configured to execute the later-described processing.

The power supply unit 202 is a power supply that at least supplies power when the control unit 201 and the power transmission unit 203 operate. For example, the power supply unit 202 may be a wired power reception circuit that receives power supplied from a commercial power supply, a battery, or the like. Under control by the control unit 201, the power transmission unit 203 generates an AC voltage and an AC current in the power transmission coil 205 in order to transmit power to the power reception apparatus 101 via the power transmission coil 205. For example, the power transmission unit 203 converts a DC voltage supplied from the power supply unit 202 into an AC voltage using a half-bridge or full-bridge switching circuit in which a field-effect transistor (FET) is used. In this case, the power transmission unit 203 includes a gate driver that controls the ON and OFF of the FET.

The first communication unit 204 performs control communication for wireless power transmission based on the WPC standard with a communication unit (first communication unit 303 illustrated in FIG. 3) of the power reception apparatus 101. In the present embodiment, the communication executed by the first communication unit 204 is so-called in-band communication in which the AC voltage or current generated by the power transmission unit 203 is modulated to superimpose communication-target data (signal) on wireless power (power that is transmitted).

The second communication unit 206 performs control communication for wireless power transmission based on the WPC standard with a communication unit (second communication unit 304 illustrated in FIG. 3) of the power reception apparatus 101. The second communication unit 206 performs so-called out-band communication using a frequency that is different from the frequency that the power transmission unit 203 uses for communication (frequency used for power transmission) and using an unillustrated antenna that is different from the power transmission coil 205. Out-band communication has a higher transmission speed (communication speed) than in-band communication. The control of the wireless power transmission system can be performed at higher speed by using out-band communication for control communication. In the present embodiment, the second communication unit 206 supports BLE.

The BLE standard defines identification information (Bluetooth device identification information: BD_ADDR) of BLE communication units (the second communication units 304 and 206 in the present embodiment) and manufacturers of products equipped with BLE. The identification information is represented by a Public Address or a Random Address that is determined by a random number. Random Addresses include a Static Device Address, a Resolvable Private Address, and a Non-resolvable Private Address. A Static Device Address is an address that is generated using a random number that is generated each time the second communication unit 304 or 206 (BLE communication unit) is turned on. A Non-resolvable Private Address is a random-number address that is generated each time a predetermined amount of time elapses. A Resolvable Private Address is an address that is generated based on an encryption key exchanged between a central and a peripheral.

In the present embodiment, description will be provided supposing that the Static Device Address among the Random Addresses is used as the identification information of the second communication unit 206. However, the identification information is not limited to being a Static Device Address, and may be a Public Address, a Resolvable Private Address, or a Non-resolvable Private Address.

Furthermore, while the second communication unit 206 supports BLE in the present embodiment, a communication unit supporting another wireless communication method, such as near-field communication (NFC) or WiFi, may be used in place of the second communication unit 206. The first communication unit 204 may have a smaller communication range than the second communication unit 206.

The memory 207 stores the states of the elements and the entirety of the power transmission apparatus and the wireless power transmission system.

In FIG. 2, the control unit 201, the power supply unit 202, the power transmission unit 203, the first communication unit 204, the memory 207, and the second communication unit 206 are each illustrated as a separate block. However, two or more of these blocks may be integrated using a single chip or the like. Furthermore, one block may be divided into a plurality of blocks.

[Configuration of Power Reception Apparatus]

Figure 3:
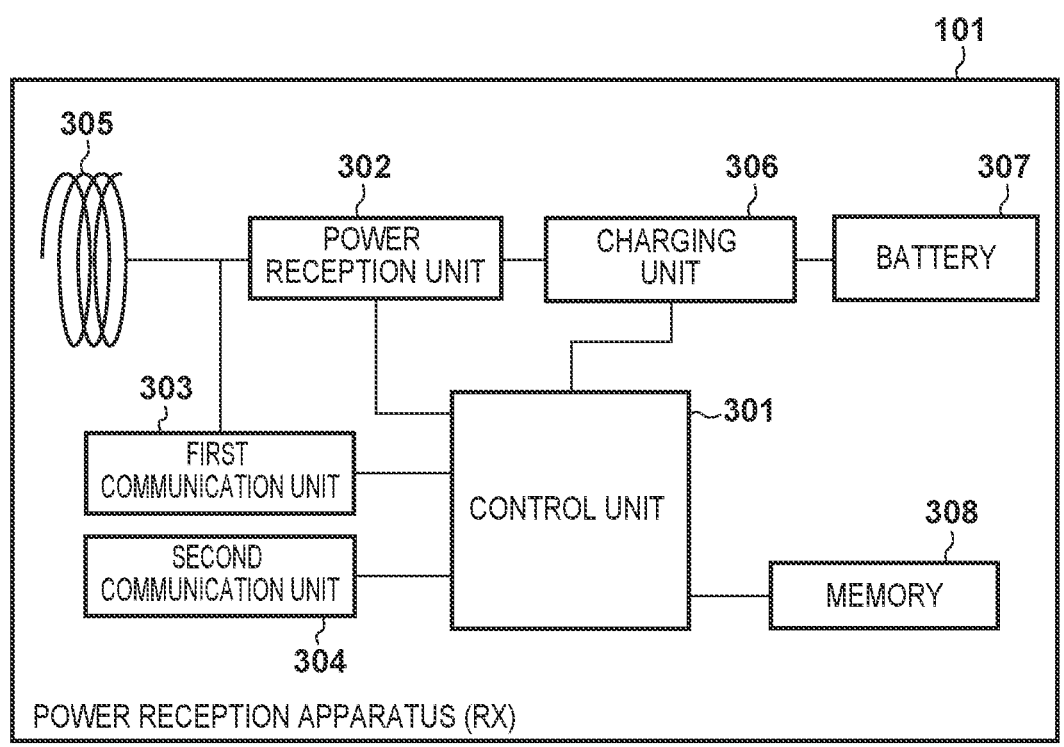
FIG. 3 is a block diagram illustrating an example configuration of a power reception apparatus.

FIG. 3 is a block diagram illustrating an example configuration of the power reception apparatus 101. For example, the power reception apparatus 101 includes a control unit 301, a power reception unit 302, the first communication unit 303, the second communication unit 304, a power reception coil 305, a charging unit 306, a battery 307, and a memory 308.

The control unit 301 controls the entire power reception apparatus 101. As one example, the control unit 301 may be configured to include one or more processors such as a CPU and/or an MPU. Note that the control unit 301 may include an application-specific integrated circuit (ASIC), a field-programmable gate array (FPGA), or the like that is configured to execute the later-described processing.

The power reception unit 302 obtains an AC voltage and an AC current generated in the power reception coil 305 as a result of power transmission from the power transmission coil 205, and converts the received power into a DC voltage and a DC current required for the control unit 301, the charging unit 306, etc., to operate. The first communication unit 303 performs control communication for wireless power transmission based on the WPC standard with the first communication unit 204 of the power transmission apparatus 100. This control communication is performed via in-band communication in which load modulation is applied to an electromagnetic wave received by the power reception coil 305.

The second communication unit 304 performs control communication for wireless power transmission based on the WPC standard with the second communication unit 206 of the power transmission apparatus 100. The second communication unit 304 performs out-band communication using a frequency that is different from the frequency of the electromagnetic wave received by the power reception unit 302 and using an unillustrated antenna that is different from the power reception coil 305. In the present embodiment, description will be provided supposing that the second communication unit 304 supports BLE, and the Static Device Address among the Random Addresses is used as the identification information of the second communication unit 304. However, the identification information is not limited to being a Static Device Address, and may be a Public Address, a Resolvable Private Address, or a Non-resolvable Private Address.

Furthermore, while the second communication unit 304 supports BLE in the present embodiment, a communication unit supporting another wireless communication method, such as NFC or WiFi, may be used in place of the second communication unit 304. Furthermore, while the second communication unit 304 operates by directly receiving power supply from the power reception unit 302, the second communication unit 304 may receive power supply from the battery 307. The first communication unit 303 may have a smaller communication range than the second communication unit 304.

The charging unit 306 charges the battery 307 using the DC voltage and the DC current supplied from the power reception unit 302. The memory 308 stores the states of the elements and the entirety of the power reception apparatus 101 and the wireless power transmission system.

In FIG. 3, the control unit 301, the power reception unit 302, the first communication unit 303, the second communication unit 304, the charging unit 306, and the memory 308 are each illustrated as a separate block. However, two or more of these blocks may be integrated using a single chip or the like. Furthermore, one block may be divided into a plurality of blocks.

[Basic Operations of Power Transmission Apparatus and Power Reception Apparatus]

FIG. 4 is a sequence diagram of the power transmission apparatus and the power reception apparatus. The basic operations of the power transmission apparatus 100 and the power reception apparatus 101 will be described with reference to part of FIG. 4. Note that the power transmission apparatus 100 and the power reception apparatus 101 in the present embodiment comply with version 1.2.3 of the WPC standard, and also support out-band communication via BLE. Note that, in the following description, data/requests that are transmitted using General Request defined by the WPC standard will be indicated by "GRQ( )". Furthermore, data/requests that are transmitted using Special Request defined by the WPC standard will be indicated by "SRQ( )".

The power transmission apparatus 100 transmits Analog Ping (hereinafter "A-Ping") in order to detect an object present near the power transmission coil 205 (F400). A-Ping is pulsed power, and is power for detecting an object. Even if the power reception apparatus 101 receives A-Ping, this power is too small to activate the control unit 301 of the power reception apparatus 101. The power transmission apparatus 100 detects an object based on a shift of the resonant frequency of the internal voltage value of the power transmission coil 205 and a change in the value of the current/voltage flowing in the power transmission coil 205, which occur when an object is present near the power transmission coil 205.

Upon detecting an object using A-Ping, the power transmission apparatus 100 measures the Q factor of the power transmission coil 205 (F401). It suffices that a well-known method be used for the Q factor measurement, and detailed description thereof is thus omitted. Upon completion of the Q factor measurement, the power transmission apparatus 100 starts to transmit Digital Ping (hereinafter "D-Ping") (F402). D-Ping is power for activating the control unit 301, the second communication unit 304, etc., of the power reception apparatus 101, and is greater than A-Ping. Furthermore, D-Ping (F402) is continuously transmitted following this point. That is, the power transmission apparatus 100 continues to transmit power that is greater than or equal to D-Ping from when the transmission of D-Ping is started to when End Power Transfer (EPT) data (signal), which is a request to stop power transmission, is received from the power reception apparatus 101.

Upon receiving D-Ping and being activated, the power reception apparatus 101 transmits Signal Strength, which is data in which the voltage value of the received D-Ping is stored, to the power transmission apparatus 100 (F403).

Subsequently, the power reception apparatus 101 transmits data in which is stored an ID including device identification information and the version information of the WPC standard with which the power reception apparatus 101 complies (F404). Furthermore, the power reception apparatus 101 transmits, to the power transmission apparatus 100, Configuration data including information such as the maximum value of power that the power reception unit 302 supplies to a load (i.e., the charging unit 306) (F405).

In the present example, the power transmission apparatus 100 responds with ACK upon determining that the power reception apparatus 101 supports an extension protocol of WPC standard version 1.2 or later by receiving the ID and Configuration data (F406). The extension protocol is a protocol including the later-described Negotiation phase.

Upon receiving ACK, the power reception apparatus 101 transitions to the Negotiation phase, in which negotiation of power to be transmitted and received, etc., are performed. First, the power reception apparatus 101 transmits Foreign Object Detection (FOD) Status data to the power transmission apparatus 100 (F407). In the present embodiment, the FOD Status data is indicated by "FOD(Q)". The power transmission apparatus 100 performs foreign object detection based on the Q factor stored in the received FOD(Q) and the Q factor measured in the Q factor measurement (F401). In the present example, the power transmission apparatus 100 determines that the probability is high of there being no foreign object, and, in this case, the power transmission apparatus 100 transmits, to the power reception apparatus 101, ACK indicating that it has been determined that the probability is high of there being no foreign object (F408).

Upon receiving ACK, the power reception apparatus 101 transmits GRQ(CAP) to make an inquiry of the capability of the power transmission apparatus 100 (F409). Upon receiving GRQ(CAP), the power transmission apparatus 100 transmits Capability data (indicated by "CAP"), in which is stored information of the capability that the power transmission apparatus 100 supports (F410).

Subsequently, the power transmission apparatus 100 and the power reception apparatus 101 perform a negotiation of Guaranteed Power (GP), which is the maximum value of the power value that the power reception apparatus 101 will request to receive. Guaranteed Power is the maximum value of the load power (power consumed by the charging unit 306) in the power reception apparatus 101 that is agreed upon in the negotiation between the power transmission apparatus 100 and the power reception apparatus 101.

In the negotiation, first, the power reception apparatus 101 transmits, to the power transmission apparatus 100, data (indicated by "SRQ(GP)") in which a Guaranteed Power value requested by the power reception apparatus 101 is stored (F411). Subsequently, upon receiving SRQ(GP), the power transmission apparatus 100 responds to SRQ(GP) in consideration of the power transmission capability, etc., thereof. In the present example, the power transmission apparatus 100 determines that the Guaranteed Power is acceptable, and transmits ACK indicating that the request is accepted (F412). In the present example, the power reception apparatus 101 makes a request for 15 W Guaranteed Power in SRQ(GP), and the power transmission apparatus 100 accepts this request.

Next, the power reception apparatus 101 notifies the power transmission apparatus 100 of the BD_ADDR (indicated by "GRQ(PRX_BD_ADDR)") of the second communication unit 304 (F413). Upon receiving GRQ(PRX_BD_ADDR), the power transmission apparatus 100 responds with ACK (F414). Subsequently, the power reception apparatus 101 transmits a request (indicated by "GRQ(PTX_BD_ADDR_ADDR)" (F415)) for notification of the BD_ADDR of the second communication unit 206 of the power transmission apparatus 100 (F415). Upon receiving GRQ(PTX_BD_ADDR_ADDR), the power transmission apparatus 100 notifies the power reception apparatus 101 of the BD_ADDR (indicated by "PTX_BD_ADDR") of the second communication unit 206 (F416).

Next, the power reception apparatus 101 transmits a request (indicated by "SRQ(CONNECT)") for establishing connection of out-band communication as the control communication (F417). In the present example, the power transmission apparatus 100 agrees to perform out-band communication via BLE, and, in this case, transmits ACK in response to the received SRQ(CONNECT) (F418).

Upon receiving ACK, the power reception apparatus 101 transmits a request (indicated by "SRQ(EN)") for termination of the Negotiation phase (F419). Upon receiving SRQ(EN), the power transmission apparatus 100 determines whether or not the Negotiation phase can be terminated. In the present example, the power transmission apparatus 100 determines that the Negotiation phase is to be terminated, and transmits ACK (F420).

Upon receiving ACK, the power reception apparatus 101 activates the second communication unit 304 directly using the power received by the power reception unit 302, rather than using power from the battery 307. Then, the power reception apparatus 101 broadcasts ADVERTISE_INDICATION (hereinafter indicated by "ADV") using the second communication unit 304 (F421). ADV is a signal defined by the BLE standard. ADV is a signal that is broadcast by a device in the Advertiser state as defined by the BLE standard and is for providing a notification of the BD_ADDR of the device and information of services supported by the device.

Upon transmitting ACK (F420), the power transmission apparatus 100 activates the second communication unit 206 as a Scanner and waits to receive ADV. In the present example, before a predetermined period of time for which the second communication unit 206 operates as a Scanner elapses, the power transmission apparatus 100 receives, from the power reception apparatus 101, ADV including the BD_ADDR received in F413 via the in-band communication. In this case, the power transmission apparatus 100 causes the second communication unit 206 to operate as an Initiator as defined by the BLE standard. The second communication unit 206 operating as an Initiator transmits, to the received BD_ADDR, Connect_indication (hereinafter indicated by "CONNECT"), which is a BLE connection request message (F422). Following this point, the control communication between the power transmission apparatus 100 and the power reception apparatus 101 is performed via BLE (i.e., via the second communication unit 206 and the second communication unit 304).

The power transmission apparatus 100 and the power reception apparatus 101 perform Calibration processing in order to create references for performing foreign object detection based on the power loss method. First, the power reception apparatus 101 transmits, to the power transmission apparatus 100, Received Power Packet(mode1) (indicated by "RP1"), in which is stored a received power value R1 corresponding to when the power reception apparatus 101 receives D-Ping in a state in which the power reception unit 302 and the load are not connected and the received power is not supplied to the load (F423).

Upon receiving RP1, the power transmission apparatus 100 transmits ACK to the power reception apparatus 101 (F424). At this time, the power transmission apparatus 100 measures a transmitted power value T1 transmitted by the power transmission apparatus 100, and calculates a difference Δ1 between T1 and R1, which corresponds to power loss.

Upon receiving ACK, the power reception apparatus 101 requests the power transmission apparatus 100 to increase or decrease the received voltage (or the received current or received power) in accordance with the load, in a state in which the power reception unit 302 and the load are connected and the received power is supplied to the load. The request is made by transmitting Control Error (hereinafter indicated by "CE") to the power transmission apparatus 100. In CE, information of a sign and a numerical value is stored. A positive sign appended to the numerical value stored in CE indicates a request to increase the received voltage, a negative sign appended to the numerical value stored in CE indicates a request to decrease the received voltage, and the numerical value zero stored in CE indicates a request to keep the received voltage the same. Here, the power reception apparatus 101 transmits, to the power transmission apparatus 100, CE(+) indicating that the received voltage is to be increased (F425).

Upon receiving CE(+), the power transmission apparatus 100 increases the transmitted voltage by changing a power transmission circuit setting value. When the received power increases in response to CE(+), the power reception apparatus 101 supplies the received power to the charging unit 306, which is the load, and transmits Received Power Packet(mode2)) (RP2) to the power transmission apparatus 100 (F426). Here, in RP2, a received power value R2 in a state in which the power reception apparatus 101 supplies the output from the power reception unit 302 to the load (charging unit 306) is stored.

Upon receiving RP2, the power transmission apparatus 100 transmits ACK to the power reception apparatus 101 (F427). At this time, the power transmission apparatus 100 measures a transmitted power value T2 transmitted by the power transmission apparatus 100, and calculates a difference 42 between T2 and R2, which corresponds to power loss. Subsequently, the power transmission apparatus 100 performs power-loss-based foreign object detection using the power loss 41 (the power loss when the power reception unit 302 and the load are not connected and thus power consumed by the load is 0) and the power loss 42 (the power loss when the power reception unit 302 and the load are connected and thus the power consumed by the load is not 0) as references. Specifically, the power transmission apparatus 100 can predict, from 41 and 42, power loss at an arbitrarily defined received power value in a state in which there is no foreign object, and perform foreign object detection based on an actually received power value (later-described RP0) and the transmitted power value at the corresponding point in time.

This concludes the Calibration processing. Note that the Calibration processing is terminated when the power transmission apparatus 100 transmits ACK in response to RP2. Furthermore, as a result of the power transmission apparatus 100 and the power reception apparatus 101 having transitioned to a Power Transfer phase at the point when the power reception apparatus 101 received ACK in response to RP1 that it has transmitted, the power transmission apparatus 100 transmits power allowing the power reception apparatus 101 to receive the maximum of 15 W negotiated in the Negotiation phase.

The power reception apparatus 101 constantly transmits, to the power transmission apparatus 100, Received Power Packet(mode0) (RP0) storing therein the current received power value and CE (F428). Upon receiving RP0, the power transmission apparatus 100 responds with ACK (F429).

This concludes the description of the basis operations of the power transmission apparatus 100 and the power reception apparatus 101. Note that, even if the power transmission apparatus 100 receives, in F421, ADV from a transmission source having BD_ADDR other than the BD_ADDR received via in-band communication in F413, the power transmission apparatus 100 does not transmit CONNECT to the transmission source of the ADV. This allows the power transmission apparatus 100 to establish BLE connection with only the power reception apparatus 101.

Furthermore, upon receiving CONNECT from a transmission source having BD_ADDR other than the BD_ADDR received via in-band communication in F416, the power reception apparatus 101 transmits LL_TERMINATE_IND (hereinafter indicated by "TERM") indicating disconnection of BLE connection to the transmission source of CONNECT. This allows the power reception apparatus 101 to only accept the connection request from the power transmission apparatus 100.

[Conventional Power Transmission Apparatus and Power Reception Apparatus Operations Timings]

Figure 5B:
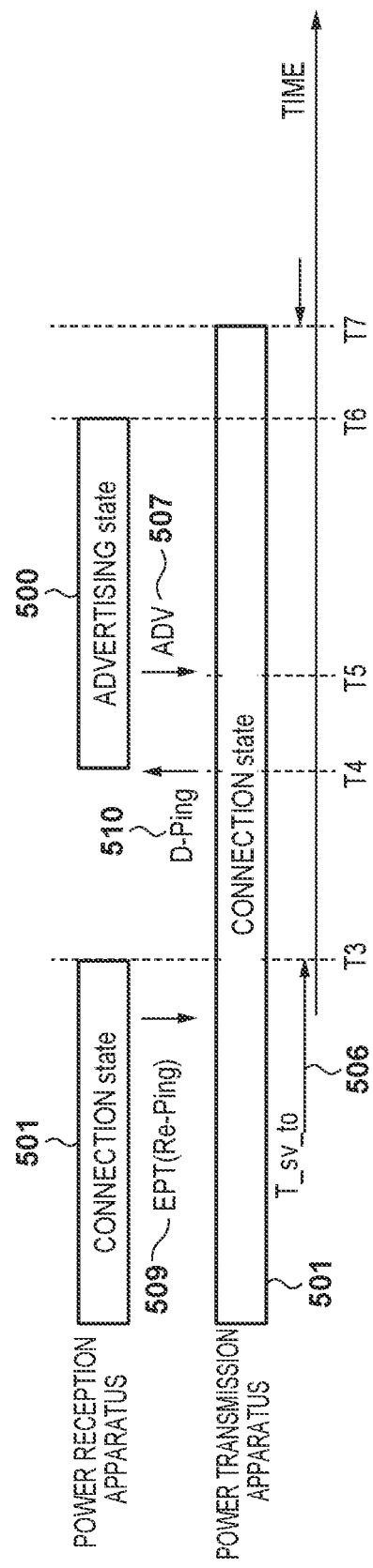
FIG. 5B is a diagram for describing operation timings of the power transmission apparatus and the power reception apparatus.

Next, conventional power transmission apparatus and power reception apparatus operation timings will be described. FIGS. 5A to 5F are diagrams for describing power transmission apparatus and power reception apparatus operation timings, and here, FIGS. 5A and 5B are diagrams for describing conventional power transmission apparatus and power reception apparatus operation timings. Here, description will be provided with reference to the power transmission apparatus 100 and the power reception apparatus 101. Suppose that the power transmission apparatus 100 and the power reception apparatus 101 have already completed procedures F400 to F420 illustrated in FIG. 4. That is, suppose that the first communication unit 204 of the power transmission apparatus 100 has already transmitted to and received from the power reception apparatus 101 information including information required for the second communication unit 206 to perform communication, and the second communication unit 206 is in a state in which the second communication unit 206 can receive ADV (F421) from the power reception apparatus 101.

In FIG. 5A, the second communication unit 304 of the power reception apparatus 101 broadcasts ADV 507 at time T1 in an ADVERTISING state 500 in which the second communication unit 304 operates as an Advertiser (F421). The second communication unit 206 of the power transmission apparatus 100 can receive ADV 507 in a SCANNING state 502 in which the second communication unit 206 operates as a Scanner. Upon receiving ADV 507, the second communication unit 206 of the power transmission apparatus 100 transitions to an INITIATING state 503 for performing BLE connection processing, and transmits CONNECT 508 to the power reception apparatus 101 (F422). Having transmitted CONNECT 508 to the power reception apparatus 101, the second communication unit 206 of the power transmission apparatus 100 transitions to a CONNECTION state 501. Furthermore, upon receiving CONNECT 508 from the power transmission apparatus 100, the second communication unit 304 of the power reception apparatus 101 transitions to the CONNECTION state 501.

Here, suppose that, as illustrated in FIG. 5B, the second communication unit 304 of the power reception apparatus 101 transmits EPT(Re-Ping) 509 defined by the WPC standard to the power transmission apparatus 100 when the second communication unit 206 of the power transmission apparatus 100 and the second communication unit 304 of the power reception apparatus 101 are in the CONNECTION state 501. EPT is an abbreviation of End Power Transfer, and is data that is a request to stop power transmission. Furthermore, Re-Ping indicates that power transmission is to be stopped for a certain period (Re-Ping time), but D-Ping is to be transmitted again after a predetermined amount of time.

After receiving EPT(Re-Ping) 509, the power transmission apparatus 100 determines to stop power transmission to the power reception apparatus 101, and stops power transmission within time T_terminate. Here, suppose that the power transmission apparatus 100 stops power transmission at time T3. Because the second communication unit 304 of the power reception apparatus 101 operates on the power received by the power reception unit 302 rather than power from the battery 307, the second communication unit 304 terminates the CONNECTION state 501 at time T3, which is the time when the power transmission apparatus 100 stops power transmission. Upon terminating the CONNECTION state 501, the second communication unit 304 of the power reception apparatus 101 does not transmit any data to the power transmission apparatus 100. Because power is re-input to the second communication unit 304 of the power reception apparatus 101 (the second communication unit 304 is turned on again) when communication is resumed, the BD_ADDR thereof may change.

The second communication unit 206 of the power transmission apparatus 100 includes a timer defined by the BLE standard in order to determine whether or not the BLE connection with the second communication unit 304 of the power reception apparatus 101 is disconnected (link loss). The timer is called a Supervision timer, and the timeout time is indicated by "T_sv_to" 506 in the present embodiment. Note that, according to the BLE standard, the timeout time is 20 seconds by default.

If no data at all is received from the second communication unit 304 of the power reception apparatus 101 during T_sv_to, the second communication unit 206 of the power transmission apparatus 100 terminates the CONNECTION state 501. In the present embodiment, T_sv_to begins at time T3 and times out at time T7.

When the power transmission apparatus 100 terminates power transmission at time T3 and a predetermined power transmission stop period (Re-Ping time; 500 milliseconds by default according to the WPC standard) ends, the first communication unit 204 re-transmits D-Ping 510 at time T4. The power reception apparatus 101 receives D-Ping 510 via the first communication unit 303, and activates the second communication unit 304. After procedures F403 to F420 in FIG. 4, the second communication unit 304 of the power reception apparatus 101 broadcasts ADV 507 at time T5 in the ADVERTISING state 500 continuing until time T6 (F421).

At time T5, the second communication unit 206 of the power transmission apparatus 100 is in the CONNECTION state 501 because the Supervision timer in the power transmission apparatus 100 has not timed out. That is, the second communication unit 206 of the power transmission apparatus 100 cannot receive ADV 507 transmitted at time T5 because the second communication unit 206 is not in the SCANNING state 502. Accordingly, the second communication unit 304 of the power reception apparatus 101 cannot transition to the CONNECTION state 501, and control communication via BLE cannot be performed following this point. On the other hand, when T_sv_to described above times out at time T7, the second communication unit 206 of the power transmission apparatus 100 can transition to the SCANNING state 502 or the INITIATING state 503. However, this time, the second communication unit 304 of the power reception apparatus 101 has already terminated the ADVERTISING state 500 at time T6. Accordingly, the second communication unit 206 of the power transmission apparatus 100 cannot receive ADV (F421).

In such a manner, conventionally, the second communication unit 206 of the power transmission apparatus 100 cannot transition to the SCANNING state or the INITIATING state while the second communication unit 304 of the power reception apparatus 101 is in the ADVERTISING state. Thus, the power transmission apparatus 100 in the present embodiment operates as follows.

Processing by Power Transmission Apparatus in Present Embodiment

Figure 6A:
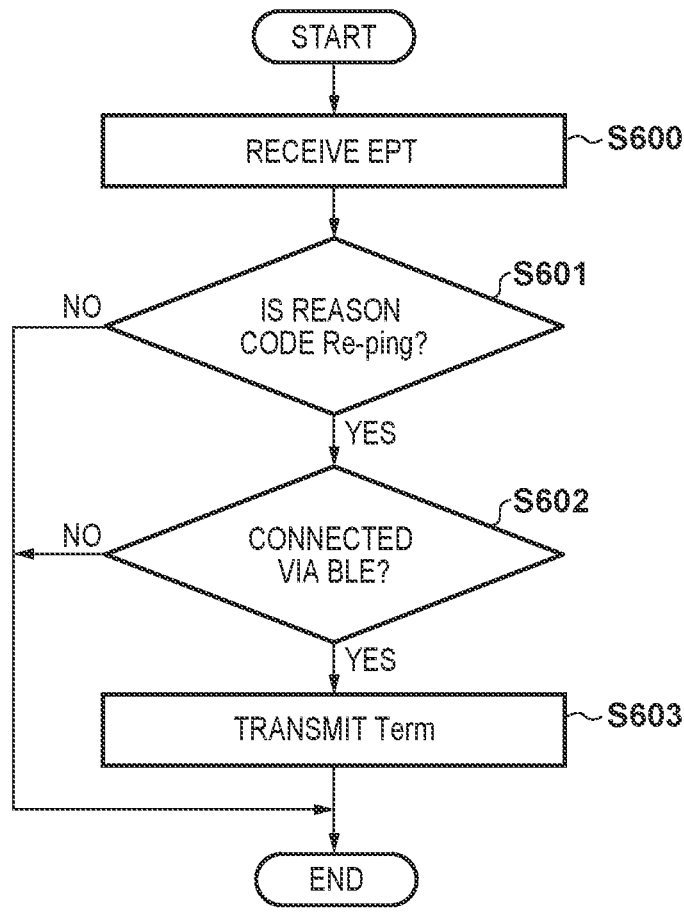
FIG. 6A is a flowchart illustrating an example of a flow of processing by the power transmission apparatus.

FIG. 6A shows a flowchart illustrating an example of a flow of processing by the power transmission apparatus 100 in the present embodiment. This flow may be started when the second communication unit 206 of the power transmission apparatus 100 receives EPT from a power reception apparatus while in the CONNECTION state 501, as illustrated in the left side of FIG. 5B.

When the second communication unit 206 of the power transmission apparatus 100 receives EPT from a power reception apparatus (step S600), the control unit 201 determines whether or not the reason code included in EPT is Re-Ping (step S601). Processing proceeds to step S602 if the reason code is Re-Ping (Yes in step S601), and processing is terminated if the reason code is not Re-Ping (No in step S601). In step S602, the control unit 201 determines whether or not the second communication unit 206 is connected to a power reception apparatus via BLE. If the second communication unit 206 is connected to a power reception apparatus via BLE (Yes in step S602), the second communication unit 206 transmits TERM to the power reception apparatus (step S603). As discussed above, TERM is LL_TERMINATE_IND indicating disconnection of BLE connection. The power transmission apparatus 100 stops power transmission after transmitting TERM, and the second communication unit 206 can transition to the SCANNING state 502 or the INITIATING state 503. On the other hand, if the second communication unit 206 is not connected to any power reception apparatus via BLE (No in step S602), processing is terminated.

Figure 5C:
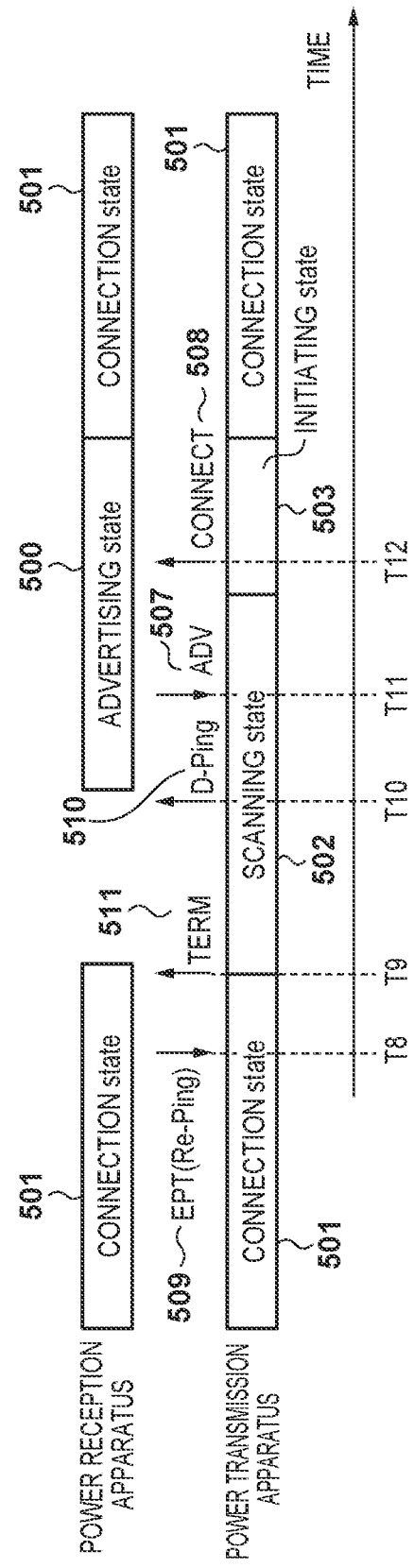
FIG. 5C is a diagram for describing operation timings of the power transmission apparatus and the power reception apparatus.

Next, operations of the power reception apparatus 101 and the power transmission apparatus 100 operating based on the flow in FIG. 6A will be described. FIG. 5C is a diagram for describing operation timings of the power reception apparatus 101 and the power transmission apparatus 100 operating based on the flow in FIG. 6A. Furthermore, reference will also be made to the processing from F430 in FIG. 4.

The second communication unit 206 of the power transmission apparatus 100 receives EPT(Re-Ping) 509 from the power reception apparatus 101 at time T8 when the second communication unit 206 of the power transmission apparatus 100 and the second communication unit 304 of the power reception apparatus 101 are in the CONNECTION state 501 (F430). Because the second communication unit 206 is connected to the second communication unit 304 of the power reception apparatus 101 via BLE, the second communication unit 206 transmits TERM 511 at time T9 (F431). Subsequently, the power transmission apparatus 100 stops power transmission. Then, at time T10 after the elapse of the Re-Ping time, the first communication unit 204 of the power transmission apparatus 100 re-transmits D-Ping 510 (F432). The power reception apparatus 101 receives D-Ping 510 via the first communication unit 303, and activates the second communication unit 206. After procedures F403 to F420 (F433) in FIG. 4, the second communication unit 304 of the power reception apparatus 101 broadcasts ADV 507 at time T11 (F434).

Because the second communication unit 206 of the power transmission apparatus 100 has transmitted TERM at time T9, the second communication unit 206 is in the SCANNING state 502 or the INITIATING state 503 after time T9. That is, after time T9, the second communication unit 206 of the power transmission apparatus 100 is in the SCANNING state 502, which means that the second communication unit 206 transitions to a state in which ADV, which is information necessary for the connection with the second communication unit 304 of the power reception apparatus 101, can be received. Then, after receiving ADV transmitted from the second communication unit 304 of the power reception apparatus 101 at time T11, the second communication unit 206 of the power transmission apparatus 100 transmits CONNECT 508 at time T12 in the INITIATING state 503 (F435).

As can be seen from this, the power transmission apparatus 100 in the present embodiment can re-establish BLE connection with a power reception apparatus using the second communication unit 206 upon resuming power transmission after stopping power transmission.

<Modification 1>

In the example in FIG. 5C, a configuration is adopted such that, upon receiving EPT(Re-Ping) 509, the second communication unit 206 of the power transmission apparatus 100 transmits TERM 511 before power transmission is stopped. Alternatively, the second communication unit 206 may transmit TERM after power transmission is stopped. For example, a configuration may be adopted such that the second communication unit 206 transmits TERM after the power transmission apparatus 100 stops power transmission at time T9 and before the first communication unit 204 starts to re-transmit D-Ping at time T10. Alternatively, the second communication unit 206 may transmit TERM after the first communication unit 204 starts to re-transmit D-Ping again at time T10 and before ADV is received at time T11.

<Modification 2>

Figure 6B:
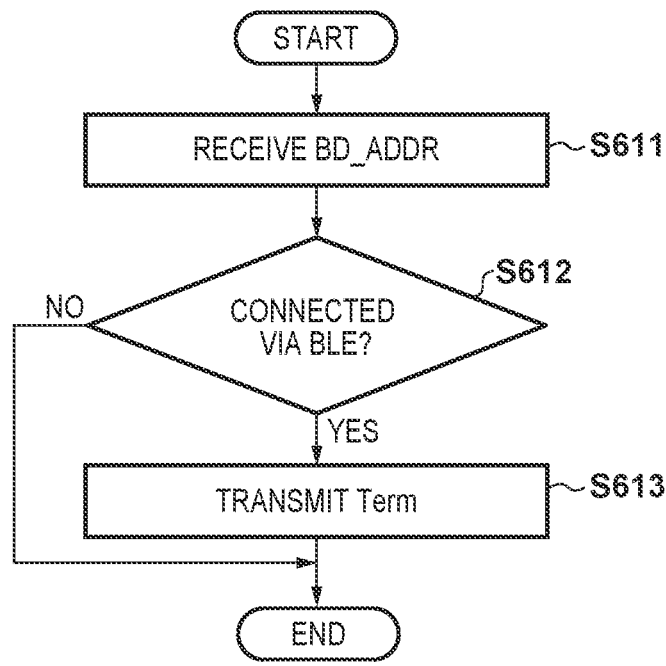
FIG. 6B is a flowchart illustrating another example of a flow of processing by the power transmission apparatus.

FIG. 6B shows a flowchart illustrating another example of a flow of processing by the power transmission apparatus 100 in the present embodiment. This flow may be started when the second communication unit 206 of the power transmission apparatus 100 is in the CONNECTION state 501, as illustrated in the left side of FIG. 5B.

When the first communication unit 204 of the power transmission apparatus 100 receives BD_ADDR from a power reception apparatus via in-band communication (step S611), processing proceeds to step S612. In step S612, the control unit 201 determines whether or not the second communication unit 206 is connected to a power reception apparatus via BLE. If the second communication unit 206 is connected to a power reception apparatus via BLE (Yes in step S612), the control unit 201 determines to stop power transmission to the power reception apparatus. Then, the second communication unit 206 transmits TERM to the power reception apparatus (S613). With reference to FIG. 5C, while TERM may be transmitted at time T9, the second communication unit 206 may transmit TERM before transmitting CONNECT 508 to BD_ADDR received via in-band communication at time T12. On the other hand, if the second communication unit 206 is not connected to any power reception apparatus via BLE (No in step S612), processing is terminated.

As described above, if BD_ADDR changes due to a power reception apparatus turning power on again or the like, the power reception apparatus can transmit BD_ADDR to the power transmission apparatus via in-band communication, and the power transmission apparatus and the power reception apparatus can re-attempt to establish connection via BLE.

<Modification 3>

In the example in FIG. 5C, the second communication unit 206 of the power transmission apparatus 100 transmits TERM. Alternatively, the second communication unit 304 of the power reception apparatus 101 may transmit TERM at the same timing as a timing described above. For example, if the control unit 301 of the power reception apparatus 101, due to some reason, determines to make a request to the power transmission apparatus 100 so that power reception stops, the second communication unit 304 may transmit TERM to the power transmission apparatus 100.

<Modification 4>

The power transmission apparatus 100 may set the timeout time (T_sv_to) of the Supervision timer, which is for determining whether BLE connection with the power reception apparatus 101 is disconnected (link loss), in accordance with the Re-Ping time. For example, the power transmission apparatus 100 may set T_sv_to so as to be shorter than the Re-Ping time.

Figure 5D:
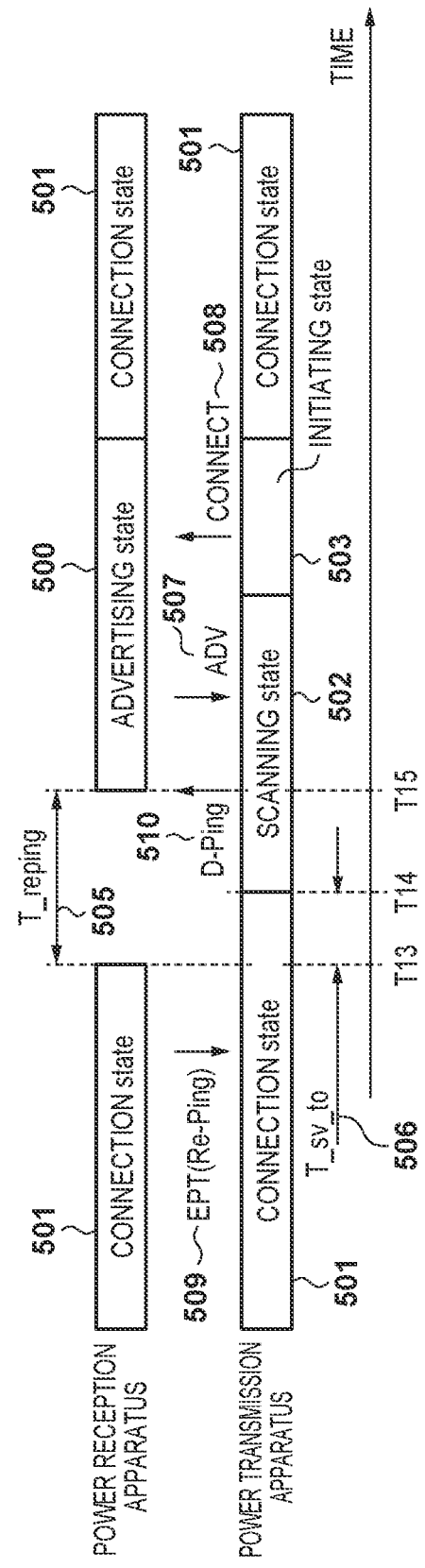
FIG. 5D is a diagram for describing operation timings of the power transmission apparatus and the power reception apparatus.

FIG. 5D is a diagram for describing operation timings of the power reception apparatus 101 and the power transmission apparatus 100 operating in such a manner. The second communication unit 206 of the power transmission apparatus 100 receives EPT(Re-ping) 509 from the power reception apparatus 101 when the second communication unit 206 of the power transmission apparatus 100 and the second communication unit 304 of the power reception apparatus 101 are in the CONNECTION state 501. Subsequently, the power transmission apparatus 100 stops power transmission at time T13. Then, at time T15 after the elapse of the Re-Ping time (T_reping 505 in the drawing), the first communication unit 204 of the power transmission apparatus 100 re-transmits D-Ping 510. Here, the power transmission apparatus 100 sets T_sv_to 506 to a shorter time than T_reping 505. This being the case, the Supervision timer times out at time T14, and the second communication unit 206 of the power transmission apparatus 100 transitions to the SCANNING state or the INITIATING state and can receive ADV and transmit CONNECT.

<Modification 5>

In the description above, the power transmission apparatus 100 functioning as a BLE central determines a value that is in accordance with the Re-Ping time as the timeout time (T_sv_to) of the Supervision timer, and sets the value as the timeout time (T_sv_to) of the Supervision timer. Alternatively, the power reception apparatus 101 functioning as a BLE peripheral may determine a value that is in accordance with the Re-Ping time as the timeout time (T_sv_to) and request the power transmission apparatus 100 to set the value as the timeout time (T_sv_to). This request can be made by transmitting, to the power transmission apparatus 100, a BLE packet including the command L2CAP_CONNECTION_PARAMETER_UPDATE_REQ or LL_CONNECTION_PARAM_REQ according to the BLE standard. The power reception apparatus 101 transmits the BLE packet at a timing included in the period of the CONNECTION state 501 in FIG. 5D. Upon receiving the BLE packet, the power transmission apparatus 100 sets the timeout time (T_sv_to) included in the BLE packet.

The control unit 201 of the power transmission apparatus 100 uses an operating system (OS), which is a basic software, in order to perform BLE communication. Due to constraints of this OS, there are cases in which the power transmission apparatus 100 cannot set the timeout time of the Supervision timer to a value desired by the power transmission apparatus 100. In such cases, by adopting the above-described configuration, the timeout time (T_sv_to) of the Supervision timer can be set to a value that is in accordance with the Re-Ping time. In such a manner, one of the power transmission apparatus 100 and the power reception apparatus 101 determines the timeout time and sets the timeout time to the other by transmitting a signal in which the timeout time can be specified. Thus, the timeout time can be set in accordance with the Re-Ping time even if one of the devices cannot determine the timeout time due to OS constraints.

<Modification 6>

In the description above, an example in which the power transmission apparatus 100 determines to stop/suspend power transmission upon receiving EPT (EPT(Re-Ping)) including the reason code Re-Ping has been described. However, other reason codes may be used. For example, the power transmission apparatus 100 may suspend power transmission upon receiving data including another reason code for suspending power transmission. Furthermore, the power transmission apparatus 100 may determine to stop/suspend power transmission if the control unit 201 detects a foreign object based on power transmitted as a result of control by the control unit 201.

<Modification 7>

A modification that is a case in which the second communication unit 206 of the power transmission apparatus 100 has the function of a central capable of simultaneously connecting to a plurality of peripherals will be described. In this case, the power transmission apparatus 100 has the function of maintaining the SCANNING state and establishing BLE connection with a power reception apparatus 101 by receiving ADV from the power reception apparatus 101 even during a period in which the power transmission apparatus 100 is in the CONNECTION state or INITIATING state with another power reception apparatus 101.

In the description regarding FIG. 6A, description has been provided that, if the second communication unit 206 of the power transmission apparatus 100 is connected to a power reception apparatus via BLE (Yes in step S602), the second communication unit 206 transmits TERM to the power reception apparatus (step S603). That is, the condition in step S602 is that BLE connection is established with one power reception apparatus. Alternatively, the condition that BLE connection is established with N (N≥2) or more power reception apparatuses may be adopted as the condition in step S602. Here, the destination to which TERM is transmitted in step S603 is the power reception apparatus from which the EPT received via in-band communication in step S600 was transmitted.

By adopting such a configuration, after stopping power transmission to the power reception apparatus 101, the power transmission apparatus 100 can continue using BLE connection with the power reception apparatus 101 via an application other than out-band communication for controlling power transmission. Furthermore, even in such a case, the power reception apparatus 101 can transmit power to and establish BLE connection with a predetermined number or more power reception apparatuses other than the power reception apparatus 101.

<Modification 8>

In the description above, description has been provided supposing that the power transmission apparatus 100 operates as a BLE central, and the power reception apparatus 101 operates as a BLE peripheral. Alternatively, the power transmission apparatus 100 may operate as a peripheral, and the power reception apparatus 101 may operate as a central.

Embodiment 2

In the present embodiment, the power transmission apparatus 100 transmits power to and establishes BLE connection with one power reception apparatus 101 (hereinafter power reception apparatus A), and then transmits power to and establishes BLE connection with another power reception apparatus 101 (hereinafter power reception apparatus B). For example, this situation may occur when the power reception apparatus A is removed by a user and replaced with the power reception apparatus B.

Figure 5E:
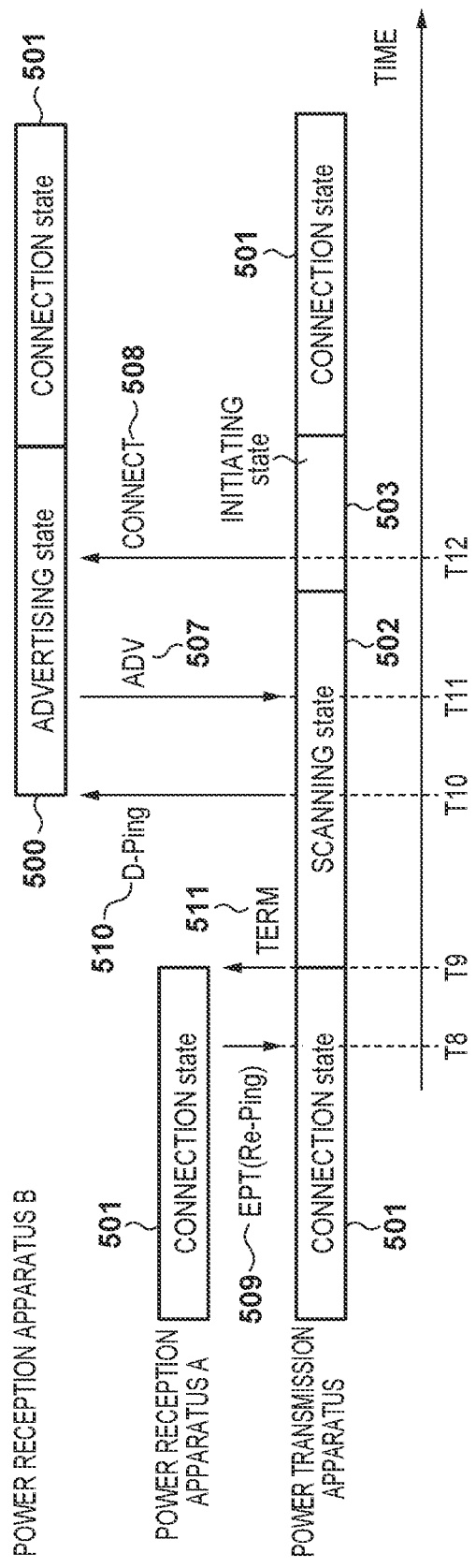
FIG. 5E is a diagram for describing operation timings of the power transmission apparatus and the power reception apparatus.

FIG. 5E is a diagram describing operation timings of the power transmission apparatus and the power reception apparatuses A and B in the present embodiment.

The second communication unit 206 of the power transmission apparatus 100 receives EPT(Re-Ping) 509 from the power reception apparatus A at time T8 when the second communication unit 206 of the power transmission apparatus 100 and the second communication unit 304 of the power reception apparatus A are in the CONNECTION state 501. The second communication unit 206 transmits TERM 511 at time T9 because the second communication unit 206 is connected to the second communication unit 304 of the power reception apparatus A via BLE. Subsequently, the power transmission apparatus 100 stops power transmission. Here, the power reception apparatus A is removed by a user and replaced with the power reception apparatus B between time T9 and time T10. Then, at time T10 after the elapse of the Re-Ping time, the first communication unit 204 of the power transmission apparatus 100 re-transmits D-Ping 510. The power reception apparatus B receives D-Ping 510 via the first communication unit 303, and activates the second communication unit 206. After procedures F403 to F420 (F433) in FIG. 4, the second communication unit 304 of the power reception apparatus B broadcasts ADV 507 at time T11.

Because the second communication unit 206 of the power transmission apparatus 100 has transmitted TERM at time T9, the second communication unit 206 is in the SCANNING state 502 or the INITIATING state 503 after time T9. That is, after time T9, the second communication unit 206 of the power transmission apparatus 100 is in the SCANNING state 502, which means that the second communication unit 206 transitions to a state in which ADV, which is information necessary for the connection with the second communication unit 304 of the power reception apparatus B, can be received. Then, at time T11, the second communication unit 206 of the power transmission apparatus 100 receives ADV transmitted from the second communication unit 304 of the power reception apparatus B. It can be ascertained that the ADV is that from the power reception apparatus B based on whether or not BD_ADDR included in the ADV matches the BD_ADDR received via in-band communication in F413. If the BD_ADDRs match, the power transmission apparatus 100 transmits CONNECT 508 at time T12 in the INITIATING state 503.

As described above, the power transmission apparatus 100 in the present embodiment can establish BLE connection with the power reception apparatus B in a case in which the power transmission apparatus 100 starts power transmission to the power reception apparatus B after stopping power transmission to the power reception apparatus A.

<Modification 9>

In the example in FIG. 5E, upon receiving EPT (EPT(Re-Ping) 509) including the reason code Re-Ping, the power transmission apparatus 100 transmits TERM 511 before stopping power transmission. Alternatively, the power transmission apparatus 100 may perform the same processing upon receiving EPT including a reason code indicating the completion of charging. By adopting such a configuration, the power transmission apparatus 100 can transmit power to and establish BLE connection with the power reception apparatus B also in a case in which the user replaces the power reception apparatus A with the power reception apparatus B upon completion of charging of the power reception apparatus A.

<Modification 10>

In the example in FIG. 5E, the power transmission apparatus 100 transmits D-Ping 510 at time T10. Alternatively, a configuration may be adopted such that the power transmission apparatus 100 repeatedly transmits A-Ping starting from time T10, and transmits D-Ping 510 after an object is detected. By adopting such a configuration, the power transmission apparatus 100 can transmit power to and establish BLE connection with the power reception apparatus B even if there is an interval until the power reception apparatus B is mounted after the power reception apparatus A is removed. Note that a configuration may be adopted such that the above-described processing is performed in a case in which EPT including a reason code other than the reason code Re-Ping, e.g., a reason code indicating the completion of charging, is received.

<Modification 11>

In the example in FIG. 5E, upon receiving EPT(Re-Ping) 509, the power transmission apparatus 100 transmits TERM 511 before stopping power transmission. Alternatively, the power transmission apparatus 100 may perform the same processing if CE or RP0 to be constantly received from the power reception apparatus A cannot be received continuously for a predetermined amount of time or more. The predetermined amount of time is an amount of time exceeding a transmission interval, as defined by the WPC standard, at which the power reception apparatus 101 transmits CE or RP0. By transmitting power to and establishing BLE connection with the power reception apparatus B in a case in which there is an interval until the power reception apparatus B is mounted after the power reception apparatus A is removed, the power transmission apparatus 100 can transmit power to and establish BLE connection with the power reception apparatus B even if the power reception apparatus A is removed and replaced with the power reception apparatus B while power is being transmitted to the power reception apparatus A in the Power Transfer phase.

<Modification 12>

As was the case in modification 4, the power transmission apparatus 100 in the present embodiment may set the timeout time (T_sv_to) of the Supervision timer, which is for determining whether BLE connection with the power reception apparatus 101 is disconnected (link loss), in accordance with the Re-Ping time.

Figure 5F:
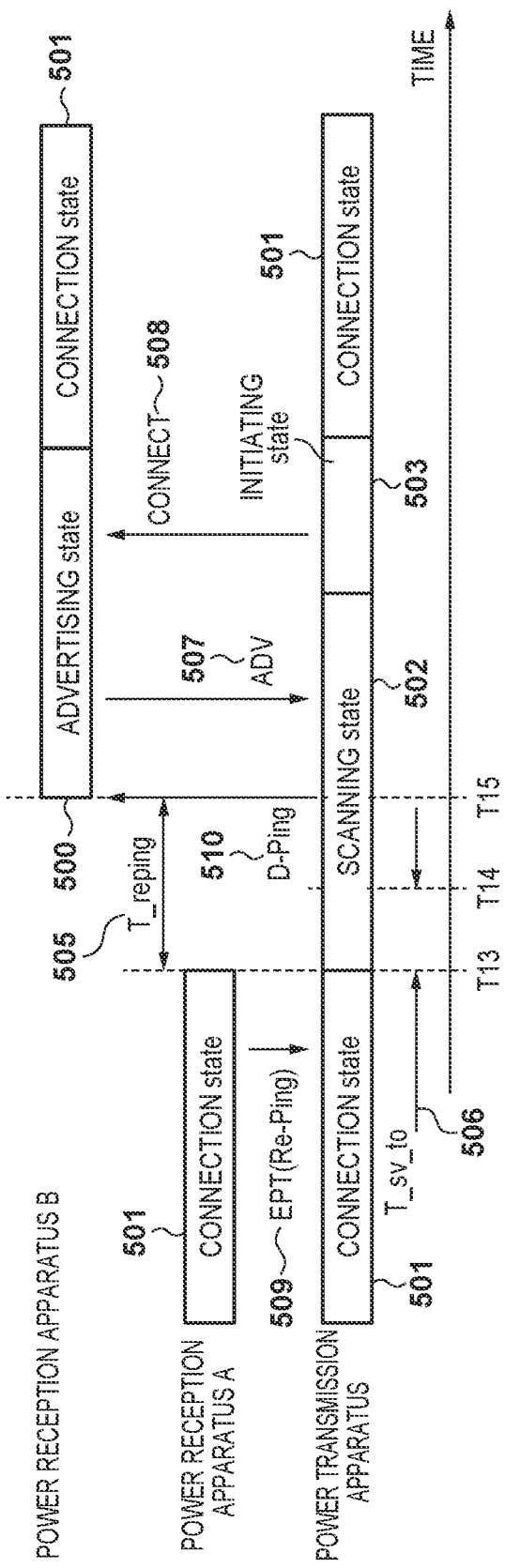
FIG. 5F is a diagram for describing operation timings of the power transmission apparatus and the power reception apparatus.

FIG. 5F is a diagram for describing operation timings of the power reception apparatuses A and B and the power transmission apparatus 100 operating in such a manner. The second communication unit 206 of the power transmission apparatus 100 receives EPT(Re-Ping) 509 from the power reception apparatus A when the second communication unit 206 of the power transmission apparatus 100 and the second communication unit 304 of the power reception apparatus A are in the CONNECTION state 501. Subsequently, the power transmission apparatus 100 stops power transmission at time T13. Here, the power reception apparatus A is removed by a user and replaced with the power reception apparatus B between time T13 and time T15. Then, at time T15 after the elapse of the Re-Ping time (T_reping 505 in the drawing), the first communication unit 204 of the power transmission apparatus 100 re-transmits D-Ping 510. The power reception apparatus B receives D-Ping 510 via the first communication unit 303, and activates the second communication unit 206. After procedures F403 to F420 (F433) in FIG. 4, the second communication unit 304 of the power reception apparatus B broadcasts ADV 507 at time T11. Here, the power transmission apparatus 100 sets T_sv_to 506 to a shorter time than T_reping 505. This being the case, the Supervision timer times out at time T14, and the second communication unit 206 of the power transmission apparatus 100 transitions to the SCANNING state or the INITIATING state and can receive ADV transmitted by the power reception apparatus B and transmit CONNECT.

According to the present disclosure, communication between a power transmission apparatus and a power reception apparatus that can execute both in-band communication and out-band communication can be controlled appropriately.

Other Embodiments

For example, the above-described processing illustrated in FIGS. 6A and 6B may be realized by the control unit 201 of the power transmission apparatus 100 controlling functional units by reading and executing programs stored in advance. However, there is no limitation to this, and at least part of such processing may be realized using hardware. For example, if processing is to be realized using hardware, a dedicated circuit may be automatically generated on a field-programmable gate array (FPGA) from a program for realizing each processing step using a predetermined compiler. Alternatively, a configuration may be adopted such that hardware executing at least part of the above-described processing is realized by forming a gate array circuit in a manner similar to that when an FPGA is used.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmission apparatus comprising:
transmission unit configured to perform wireless power transmission to a power reception apparatus;
first communication unit configured to perform communication via a first communication method; and
second communication unit configured to perform communication via a second communication method,
wherein, in a case where the transmission unit stops wireless power transmission to the power reception apparatus in a state in which the second communication unit and the power reception apparatus are connected based on information transmitted and received between the first communication unit and the power reception apparatus, the second communication unit performs communication to connect the second communication unit and the power reception apparatus.

2. The power transmission apparatus according to claim 1, wherein:
the second method is a communication method that complies with Bluetooth standard, and
in a case where the transmission unit stops wireless power transmission to the power reception apparatus in a state in which the second communication unit is connected to the power reception apparatus based on information transmitted and received between the first communication unit and the power reception apparatus, the second communication unit transitions to a state in which a signal that is defined by the Bluetooth standard and that is broadcast from the power reception apparatus is capable of being received, and performs communication to connect to the power reception apparatus.

3. The power transmission apparatus according to claim 2, wherein
in a case where the transmission unit stops power transmission to the power reception apparatus in a state in which the second communication unit is connected to the power reception apparatus based on information transmitted and received between the first communication unit and the power reception apparatus, the second communication unit transmits, to the power reception apparatus, a signal indicating disconnection of the connection with the power reception apparatus.

4. The power transmission apparatus according to claim 2, wherein
the transmission unit stops wireless power transmission to the power reception apparatus in a case where the second communication unit receives a signal that is a request to stop wireless power transmission from the power reception apparatus.

5. The power transmission apparatus according to claim 2, wherein
the transmission unit stops wireless power transmission to the power reception apparatus in a case where the first communication unit receives identification information of a Bluetooth device.

6. The power transmission apparatus according to claim 2, wherein
the second communication unit transitions to the state in which the signal defined by the Bluetooth standard is capable of being received in a case where a Supervision timer time outs during Bluetooth connection with the power reception apparatus.

7. The power transmission apparatus according to claim 6, wherein
a timeout time of the Supervision timer is determined by one of the power transmission apparatus and the power reception apparatus and is set to the other as a result of a signal in which the timeout time is capable of being specified being transmitted.

8. A power reception apparatus comprising:
reception unit configured to wirelessly receive a power from a power transmission apparatus;
control unit configured to control wireless power reception;
first communication unit configured to perform communication via a first communication method; and
second communication unit configured to perform communication via a second communication method,
wherein in a case where the control unit determines to make a request to the power transmission apparatus so that the wireless power reception stops in a state in which the second communication unit and the power transmission apparatus are connected based on information transmitted and received between the first communication unit and the power transmission apparatus, the second communication unit performs communication to connect the second communication unit and the power transmission apparatus.

9. The power reception apparatus according to claim 8, wherein:
the second method is a communication method that complies with a Bluetooth standard, and
in a case where the control unit determines to make a request to the power transmission apparatus so that the wireless power reception stops in a state in which the second communication unit is connected to the power reception apparatus based on information transmitted and received between the first communication unit and the power reception apparatus, the second communication unit transmits, to the power transmission apparatus, a signal indicating disconnection of the connection with the power transmission apparatus.

10. A power transmission apparatus comprising:
transmission unit configured to perform wireless power transmission to a power reception apparatus;
first communication unit configured to perform communication via a first communication method; and
second communication unit configured to perform communication via a second communication method,
wherein in a case where the transmission unit stops wireless power transmission to the power reception apparatus in a state in which the second communication unit and the power reception apparatus are connected based on information transmitted and received between the first communication unit and the power reception apparatus, the second communication unit performs communication to connect the second communication unit and another power reception apparatus that is different from the power reception apparatus.

11. The power transmission apparatus according to claim 10, wherein
the transmission unit stops wireless power transmission to the power reception apparatus upon receiving a notification of completion of charging from the power reception apparatus using the first communication unit.

12. The power transmission apparatus according to claim 10, wherein
in a case where the wireless power transmission to the power reception apparatus is stopped, the transmission unit performs wireless power transmission to detect said another power reception apparatus.

13. The power transmission apparatus according to claim 10, wherein
the transmission unit stops wireless power transmission to the power reception apparatus in a case where a state in which reception from the power reception apparatus is not capable of being performed by the first communication unit continues for a predetermined amount of time or more.

14. The power transmission apparatus according to claim 10, wherein
the second communication unit transitions to a state in which a signal that is defined by a Bluetooth standard is capable of being received in a case where a Supervision timer time outs during connection with the power reception apparatus.

15. A communication method of a power transmission apparatus,
the power transmission apparatus including:
first communication unit configured to perform communication via a first communication method; and
second communication unit configured to perform communication via a second communication method,
the communication method comprising:
performing wireless power transmission to a power reception apparatus;
stopping wireless power transmission to the power reception apparatus in a state in which the second communication unit and the power reception apparatus are connected based on information transmitted and received between the first communication unit and the power reception apparatus; and
performing, via the second communication unit, communication to connect the second communication unit and the power reception apparatus in a case where the wireless power transmission to the power reception apparatus is stopped.

16. A communication method of a power reception apparatus,
the power reception apparatus including:
first communication unit configured to perform communication via a first communication method; and
second communication unit configured to perform communication via a second communication method,
the communication method comprising:
determining whether to make a request to the power transmission apparatus so that the wireless power reception stops in a state in which the second communication unit and the power transmission apparatus are connected based on information transmitted and received between the first communication unit and the power transmission apparatus; and
performing, via the second communication unit, communication to connect the second communication unit and the power transmission apparatus in a case where it is determined to make a request to the power transmission apparatus so that the wireless power reception stops.

17. A communication method of a power transmission apparatus,
the power transmission apparatus including:
first communication unit configured to perform communication via a first communication method; and
second communication unit configured to perform communication via a second communication method,
the communication method comprising:
performing wireless power transmission to a power reception apparatus;
stopping wireless power transmission to the power reception apparatus in a state in which the second communication unit and the power reception apparatus are connected based on information transmitted and received between the first communication unit and the power reception apparatus; and
in a case where the wireless power transmission to the power reception apparatus is stopped, performing, via the second communication unit, communication to connect the second communication unit and another power reception apparatus other than the power reception apparatus.

18. A non-transitory computer-readable storage medium storing a program for causing a computer to perform a communication method of a power transmission apparatus,
the power transmission apparatus including:
first communication unit configured to perform communication via a first communication method; and
second communication unit configured to perform communication via a second communication method,
the communication method comprising:
performing wireless power transmission to a power reception apparatus;
stopping wireless power transmission to the power reception apparatus in a state in which the second communication unit and the power reception apparatus are connected based on information transmitted and received between the first communication unit and the power reception apparatus; and
performing, via the second communication unit, communication to connect the second communication unit and the power reception apparatus in a case where the wireless power transmission to the power reception apparatus is stopped.

19. A non-transitory computer-readable storage medium storing a program for causing a computer to perform a communication method of a power reception apparatus,
the power reception apparatus including:
first communication unit configured to perform communication via a first communication method; and
second communication unit configured to perform communication via a second communication method,
the communication method comprising:
determining whether to make a request to the power transmission apparatus so that the wireless power reception stops in a state in which the second communication unit and the power transmission apparatus are connected based on information transmitted and received between the first communication unit and the power transmission apparatus; and performing, via the second communication unit, communication to connect the second communication unit and the power transmission apparatus in a case where it is determined to make a request to the power transmission apparatus so that the wireless power reception stops.

* * * * *